(12) United States Patent
Woodhouse

(10) Patent No.: US 7,971,385 B2
(45) Date of Patent: Jul. 5, 2011

(54) UNDER ICE CRAWLER

(76) Inventor: Archie D. Woodhouse, Fairford (CA); Ruth Woodhouse, legal representative, Fairford (CA)

( * ) Notice: Subject to any disclaimer, the term of this patent is extended or adjusted under 35 U.S.C. 154(b) by 70 days.

(21) Appl. No.: 12/264,708

(22) Filed: Nov. 4, 2008

(65) Prior Publication Data
US 2009/0151218 A1 Jun. 18, 2009

(30) Foreign Application Priority Data
Nov. 5, 2007 (CA) .................................... 2609741

(51) Int. Cl.
*A01K 97/01* (2006.01)
*A01K 91/02* (2006.01)

(52) U.S. Cl. .............................................. 43/26.1; 43/4
(58) Field of Classification Search .................... 43/26.1, 43/4
See application file for complete search history.

(56) References Cited

U.S. PATENT DOCUMENTS

| | | | |
|---|---|---|---|
| 2,803,914 A * | 8/1957 | Ellis | 43/26.1 |
| 2,845,742 A * | 8/1958 | Skillman | 43/26.1 |
| 2,904,919 A * | 9/1959 | Long | 43/4 |
| 3,001,313 A * | 9/1961 | Long | 43/4 |
| 3,007,432 A * | 11/1961 | Still | 43/26.1 |
| 3,481,064 A * | 12/1969 | Newman | 43/4 |
| 3,613,284 A * | 10/1971 | Anderson | 43/26.1 |
| 4,157,229 A * | 6/1979 | Kumm | 114/312 |
| 4,301,761 A * | 11/1981 | Fry et al. | 114/331 |
| 4,642,932 A * | 2/1987 | Austin | 43/4 |
| 4,757,633 A * | 7/1988 | Van Cleve | 43/26.1 |
| 4,826,353 A * | 5/1989 | Statham | 114/42 |
| 4,864,959 A * | 9/1989 | Takamizawa et al. | 114/315 |
| 5,016,385 A * | 5/1991 | Blease | 43/26.1 |
| 5,077,929 A * | 1/1992 | Khan | 43/26.1 |
| 5,105,753 A * | 4/1992 | Chih et al. | 114/315 |
| 5,154,016 A * | 10/1992 | Fedora et al. | 43/26.1 |
| 5,201,884 A * | 4/1993 | Nicholas | 43/26.1 |
| 5,293,712 A * | 3/1994 | Lo | 43/26.1 |
| 5,469,739 A * | 11/1995 | McGuire | 43/4 |
| 5,553,940 A * | 9/1996 | Nishihara | 43/4 |
| 5,634,423 A * | 6/1997 | Lashman | 114/315 |
| 6,122,852 A * | 9/2000 | Mechling, IV | 43/26.1 |
| 6,263,611 B1 * | 7/2001 | Kimura | 43/26.1 |
| 6,520,105 B2 * | 2/2003 | Koda et al. | 43/26.1 |
| 6,822,927 B1 * | 11/2004 | Holm | 43/26.1 |

(Continued)

FOREIGN PATENT DOCUMENTS

CA 1217471 A * 2/1987

(Continued)

*Primary Examiner* — Darren W Ark
(74) *Attorney, Agent, or Firm* — Kyle R. Satterthwaite; Ryan W. Dupuis; Ade & Company Inc.

(57) ABSTRACT

An under ice crawler lowerable into a body of water through a hole in a layer of ice overtop is operable to extend a flexible line within the body of water between two points spaced along the ice. The crawler features a floating body having sliding surfaces defined at an upper limit thereof, a motor carried on the floating body to selectively drive a propeller, a connector carried on the floating body to facilitate the connection of the line thereto and a starting device carried on the floating body and actuable from thereabove. A termination device is carried on the floating body at a position distinct from that of the starting device to provide easy access. The starter device is actuable by lowering a starting-signal generator through the hole in the ice into proximity with a starting-signal sensor carried on the float body without requiring physical contact with the receiver.

12 Claims, 6 Drawing Sheets

U.S. PATENT DOCUMENTS

| | | | |
|---|---|---|---|
| 6,836,993 B1 * | 1/2005 | Austin | 43/4 |
| 7,441,509 B2 * | 10/2008 | Piska | 43/26.1 |
| 2009/0293336 A1 * | 12/2009 | Lankinen | 43/4 |

FOREIGN PATENT DOCUMENTS

| | | | |
|---|---|---|---|
| EP | 1005790 A1 * | 6/2000 | |
| FR | 2612047 A1 * | 9/1988 | |
| FR | 2715534 A1 * | 8/1995 | |
| FR | 2715535 A1 * | 8/1995 | |
| GB | 2200823 A * | 8/1988 | |
| JP | 02276984 A * | 11/1990 | |
| WO | WO 9603869 A1 * | 2/1996 | |
| WO | WO 02080665 A1 * | 10/2002 | |
| WO | WO 2005077165 A1 * | 8/2005 | |

* cited by examiner

UNDER ICE CRAWLER

This application claims foreign priority benefits from Canadian Patent Application 2,609,741 filed Nov. 5, 2007.

FIELD OF THE INVENTION

This invention relates to fishing implements, and particularly to apparatus for drawing a fish net support rope under an ice layer covering a lake or river.

BACKGROUND OF THE INVENTION

Winter fishing through a layer of ice covering a river or lake usually involves drilling a hole in the ice and dropping a fishing line with one or a plurality of hooks through the hole. While this mode of winter fishing often satisfies the sportsman, the commercial fisherman or person relying on fishing as a source of food must find a way of catching a larger quantity of fish than is possible using the aforementioned method.

In a traditional under ice net fishing technique, a pair of holes are drilled a distance apart in the ice, and a rope is hooked to a long rod which is pushed through one hole toward the other. A second hook is lowered through the second hole, by which the rope is grasped and drawn up. By drilling a series of holes, the rope can be maneuvered substantially across the whole or part of a river under the ice, entering the river through the first hole and exiting at the final one. One corner of a net is than tied to one end of the rope, and the other end of the rope is pulled, drawing the net through one hole and into the river, thus being deployed below the ice, often extending between the two end holes. When the net is full, or at the option of the user, the net is drawn back up through the hole through which it was deployed, drawing the rope along with it. In this manner the same pair of holes can be used all winter long.

While using the conventional under ice net fishing technique has proven successful, it has been found difficult, tedious and time consuming to drill the series of holes and to draw the fish net rope under the ice initially. Sometimes one end of the rope is lost in the water, requiring its withdrawal. Further, working with a wet rope in freezing weather is uncomfortable and difficult.

Canadian Patent No. 1,217,471 teaches a crawler for drawing a rope from a hole in lake or river ice under the ice. The crawler includes a structure for stopping, fixing its horizontal location and generating a sound which can be heard above the ice whereby its location can be determined. A second hole can then be drilled in the ice between the crawler and the first hole and the rope can be hooked and drawn out with the crawler. The rope can then be used as a "fish" for deployment of a net under the ice for winter fishing. The crawler is made up of a float, a pair of skids above the float, a motor driven propeller, a switch operated by a jerk of the rope to kill the motor and a clapper for generating a knocking sound by repetitive jerking of the rope. When the crawler is pulled backwards slightly, a pick is deployed by friction with the ice for fixing its horizontal position.

While the prior art crawler certainly improves the ease with which an under ice net can be deployed over the conventional methods, there is still room for improvement. Particularly, the switching arrangement used to activate and deactivate the motor is mounted just beneath the trailing edge of a deck of the float body so as to be actuable to cut the motor by a jerk of the rope after a desired length thereof has been deployed. To prevent potential injury to the user, the switch should only be turned on after deployment of the crawler into the water through the hole in the ice, thereby requiring the use of a rod or other elongate tool to reach down through the ice to flip the switch. The positioning of the switch and the arrangement of rope and springs proximate thereto to effect turning off of the switch under jerking of the rope may make it difficult to flip the switch to the on position using the rod, especially considering that the crawler may move about somewhat once submerged and that a clear view of the switch from above the ice may be obscured.

SUMMARY OF THE INVENTION

According to a first aspect of the invention there is provided an under ice crawler lowerable through a hole in a layer of ice into a body of water therebeneath and operable to extend a flexible line within the body of water between two points spaced apart along the layer of ice, the crawler comprising:

a floating body having sliding surfaces defined at an upper limit thereof to allow sliding of the floating body along the layer of ice against an undersurface thereof;

a motor carried on the floating body to selectively drive a propeller, selective operation of the motor driving the floating body in a forward direction within the body of water below and along the layer of ice;

a connector carried on the floating body to facilitate the connection of the line thereto;

a starting device carried on the floating body, actuable from thereabove and operatively linked with the motor to effect starting thereof upon actuation of the starting device; and a termination device carried on the floating body at a position distinct from that of the starting device and operably linked with the motor to terminate operation thereof upon actuation of the termination device.

Distinctly mounted termination and starting devices cooperablefg to control operation of the motor allows mounting of the starting device in such a way as to be easily accessible from above without dependency on a particular arrangement for actuating the termination device.

According to a second aspect of the invention there is provided an under ice crawler lowerable through a hole in a layer of ice into a body of water therebeneath and operable to extend a flexible line within the body of water between two points spaced apart along the layer of ice, the crawler comprising:

a floating body having sliding surfaces defined at an upper limit thereof to allow sliding of the floating body along the layer of ice against an undersurface thereof;

a motor carried on the floating body to selectively drive a propeller, selective operation of the motor driving the floating body in a forward direction within the body of water below and along the layer of ice;

a connector carried on the floating body to facilitate the connection of the line thereto;

a termination device carried on the floating body and operably linked with the motor to terminate operation thereof upon actuation of the termination device; and a starting device operatively linked with the motor and comprising:
  a starting-signal receiver carried on the floating body and actuable to effect starting of the motor thereof upon detection of a starting-signal; and
  a starting-signal generator separate from the floating body and manually operable from above the layer of ice to deliver the starting-signal to the starting-signal sensor without physical contact therewith below the layer of ice.

Eliminating the need for physical contact to effect switching on of the motor eases actuation of the crawler by the user, as the accuracy of motion required for the user to trigger operation of the motor is reduced.

Preferably there is provided an electrical power supply carried on the floating body and installed within a bistable circuit having the starter and termination devices installed therein to establish connection between the power supply and the motor upon actuation of the starting device and retain the connection between the power supply and the motor until actuation of the termination device.

Preferably the bistable circuit is a latching relay circuit in which the starting device comprises a momentarily closable trigger switch and the termination device comprises a momentarily openable reset switch.

Preferably the trigger switch comprises a magnetic trigger switch closable by movement of a triggering magnetic source, separate from the floating body, into sufficient proximity with the magnetic trigger switch through the opening in the ice layer to effect switching thereof.

Preferably the reset switch comprises a magnetic reset switch and the termination device further comprise a resetting magnetic source, the magnetic reset switch and the resetting magnetic source being movable toward and away from one another to effect switching of the magnetic reset switch.

Preferably the termination device comprises a terminating magnetic source and a terminating magnetic switch carried on the floating body, the terminating magnetic source and the terminating magnetic switch being movable relative to one another into and out of relative positioning sufficiently proximate one another to exert a magnetic field from the terminating magnetic source on the terminating magnetic switch.

Preferably the termination device is actuable to terminate operation of the motor by application of a pulling force to the connector in a rearward direction opposite the forward direction in which the floating body is driven by the propeller, the connector being movable relative to the floating body to effect relative movement between the terminating magnetic source and the terminating magnetic switch.

Preferably there is provided a position-signal generator carried on the floating body and operable to generate a position-signal detectable above the layer of ice to determine a position of the floating body beneath the layer of ice from thereabove.

Preferably there is provided a knocker arranged to engage with the line at a point therealong spaced from connection thereof with the connector such that pulling of the line in the rearward direction effects the relative movement between the terminating magnetic source and the terminating magnetic switch and actuates the knocker to produce an audible position-signal.

Preferably the knocker comprises a lever supported for pivotal motion about an axis transverse to the forward direction and arranged to engage the line at a distance from the axis to swing an end of the knocker about the axis to contact a corresponding member carried on the floating body under pulling of the line.

Preferably spacing between the terminating magnetic source and the terminating magnetic switch is biased toward keeping the terminating magnetic switch closed within an operational circuit of the motor.

Preferably the connector is biased toward positioning the terminating magnetic source and the terminating magnetic switch relative to one another to keep the terminating magnetic switch closed within an operational circuit of the motor.

Preferably the connector comprises an eyebolt supported for axial sliding movement in a passage defined on the floating body and extending along the forward direction, a spring being fitted about the eyebolt between a collar fixed thereon and a stop defined at a fixed position along the passage, the terminating magnetic source being mounted on the eyebolt for movement therewith and the terminating magnetic switch being carried in a fixed position on the floating body.

Preferably the floating body comprises a hollow body defining the sliding surfaces.

Preferably the sliding surfaces comprise elongate surfaces spaced apart in a lateral direction transverse to the forward direction.

Preferably the hollow body comprises a molded plastic body.

Preferably switching portions of the starting and terminating devices, operable to start and terminate operation of the motor respectively, are supported within a hollow portion of the floating body and are actuable from outside the hollow portion of the floating body.

Preferably the starting device is actuable from above a deck surface of the floating body defined below and between the sliding surfaces.

BRIEF DESCRIPTION OF THE DRAWINGS

In the accompanying drawings, which illustrate an exemplary embodiment of the present invention.

DETAILED DESCRIPTION

Figure 1A:
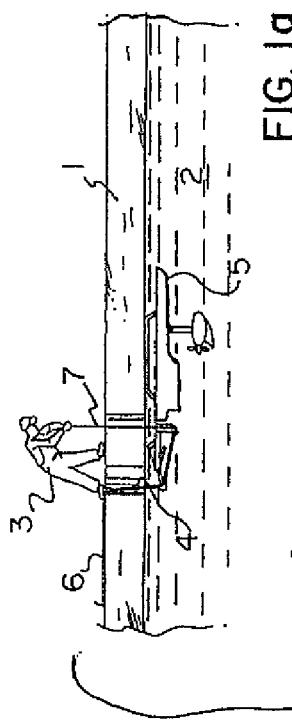
FIGS. 1A, 1B and 1C are partial cross sectional views of an ice-covered body of water illustrating the use of a prior art under ice crawler.
Figure 1B:
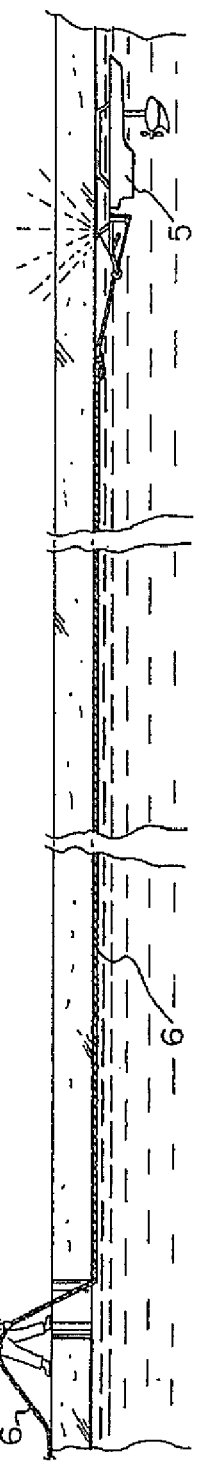
Figure 1C:
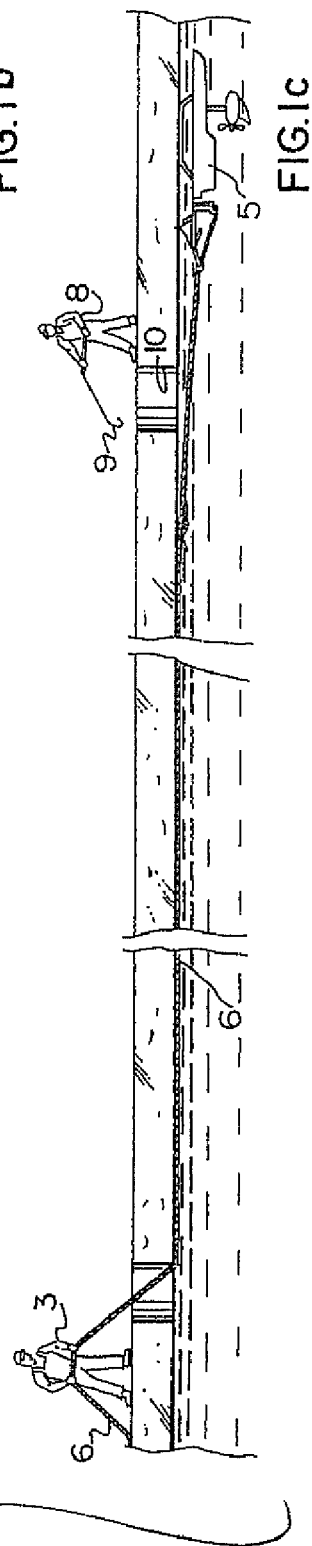

Turning to FIGS. 1A, 1B and 1C, the manner of use of the aforementioned prior art under ice crawler is illustrated. As explained below, the use of the present invention under ice crawler is similar, but features increased ease of operation due to improvements to the apparatus itself. A layer of ice 1, which may for example be approximately three feet in thickness, is shown covering a body of water such as a river or lake 2. A fisherman 3 drills a hole 4 through the ice into the water below and manoeuvres the under ice crawler 5 through the hole into the water. One end of a rope 6 is fixed to the crawler with the remainder of the rope stored on the upper surface of the ice. The under ice crawler features a body floatable in water so that the crawler will rise against the under surface of the ice when deployed in the body of water, the crawler bearing against the ice along a pair of parallel spaced apart skid-like surfaces defined at an uppermost limit of the crawler to extend lengthwise therealong. The under ice crawler is further comprised of a propelling means, such as a water sealed electric motor arranged to drive rotation of a propeller.

The fisherman 3 deploys a rod 7 through the hole, operating an electric switch on the crawler, which causes its motor to start operating. The crawler is thus propelled forward. These initial steps in use of the present invention under ice crawler are similar those of the prior art crawler, but as detailed herein below, the crawler of the illustrated embodiment of the present invention uses a magnetic switch mounted on the floating body to cooperate with a magnetic source mounted on an end of the rod 7 so that the actuation of the motor can be effected simply by lowering the end of the rod through the hole in the ice into proximity with the magnetic switch with requiring direct physical contact. Furthermore, the magnetic switch is positioned to be actuable from above a deck surface of the float body. The positioning and the contactless actuation of the switch allow for quick and easy activation of the motor compared to the prior art in which the motor-activating switch is mounted below the crawler deck and requires direct physical contact to effect switching.

Turning to FIG. 1B, the under ice crawler has moved a predetermined distance selected by the fisherman, for example 150 feet along the bottom surface of the ice. During this movement, the rope 6 has been drawn along the under surface of the ice, one end being fixed to the under ice crawler 5, and the other being held by the fisherman 3. The fisherman then suddenly pulls on the rope, which applies a tension thereto exceeding a predetermined tension. This rope tension causes a second switch on the crawler to switch into an off position to kill or deactivate the motor. While deactivation of the motor is effected by the same physical action of the fisherman as the prior art, the use of two separate switches to start and stop the motor allows for the aforementioned placement of the starting switch in an easier to access position relative to the prior art.

As in the prior art, the fisherman then jerks the rope repeatedly, thus releasing and re-exerting tension on the rope. This causes a knocker to repeatedly slam against a cooperating member on the under ice crawler. The sound is transmitted bath through the water and through the contact regions of the crawler with the underside the ice, through the ice, whereupon it can be heard above the ice.

Turning to FIG. 1C, a helper or second fisherman 8 listens for the knocking sound above the ice, and establishes the location of the under ice crawler thereby. He then drills a hole adjacent the crawler, in line and between the crawler and the first hole, which clearly will be directly over or at least in very close proximity to the rope 6. The second fisherman then lowers a hook 9 into the second hole, and retrieves the rope. He disconnects the rope from the under ice crawler, or from a short length of rope permanently fixed to the crawler. The under ice crawler is then drawn gently backward toward the second hole 10 and upward therethrough back above the ice layer.

The main rope 6, having been drawn up through the second hole, is then attached to a fish net previously stored above the ice. The first fisherman then draws on the rope, pulling the net through the second hole 10 and under the ice where it is thus deployed for as long as is desired. When the net is to be retrieved, the end remaining through the second hole 10 (or a rope attached thereto) is drawn back up and the rope 6 is thus redeployed under the ice. Thus the rope 6 becomes a permanent "fish", for drawing the net under the ice and retrieving it the entire winter period.

Figure 2:
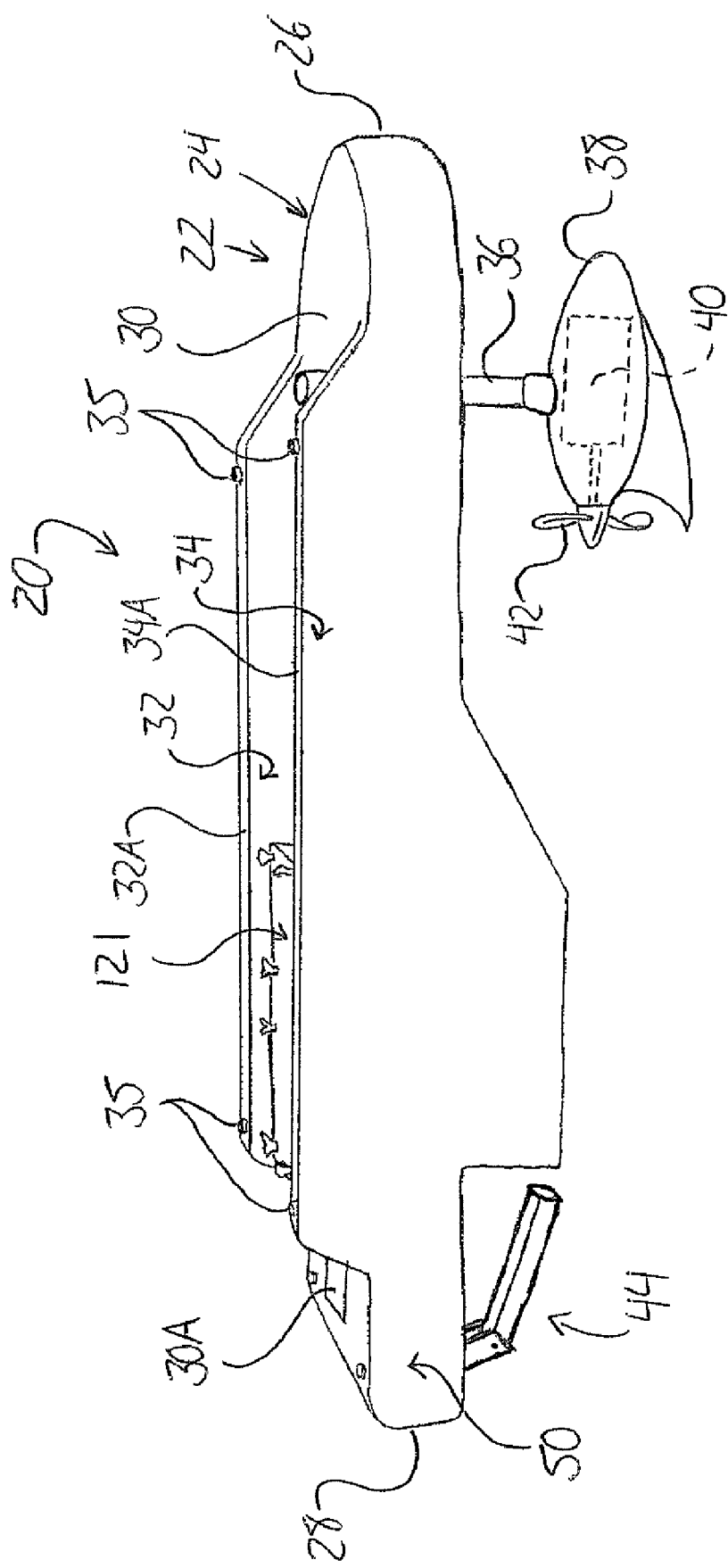
FIG. 2 is a perspective view of an under ice crawler according to the exemplary embodiment of the present invention.

FIG. 2 shows the under-ice crawler 20 according to one embodiment of the present invention. The crawler 20 features a floating body 22 defined by a hollow plastic body or shell 24 that is sealed against water penetration to protect electrical components stored within it. The hollow shell 24 features an elongate shape defining front and rear ends 26, 28. The hollow shell 24 defines a flat deck surface 30 extending horizontally from the front end 26 to the rear end 28. At opposite sides of the deck surface 30, the hollow shell 24 defines upwardly extending vertical projections 32, 34 of parallel elongate form extending lengthwise over a substantial portion of the hollow body's length. The flat horizontal uppermost surfaces 32A, 34A of these hollow walls or projections 32, 34 define skids along which the under ice crawler 20 contacts the under surface of the ice layer to slide therealong during driven movement of the under ice crawler within the body of water. Screw heads 35 project upward from the top surfaces 32A, 34A of the projecting portions 32, 34 of the hollow body 24 at spaced positions along these surfaces proximate opposite ends thereof to define the surfaces of the crawler that slide along the ice at the top of the water. The buoyancy of the floating body 24 pushes the screw heads against the bottom surface of the ice. They do not dig into the ice far enough to be significantly detrimental to sliding along the ice during driven movement of the crawler, but do contribute a gripping effect with the ice to oppose drifting of the crawler when its motor is not running.

A fixed post 36 depends downward from the floating body 20 between front ends of the hollow body's projecting portions 32, 34 proximate the front end 26 of the crawler 20 to support a water tight housing 38 containing an electric motor 40. A driveshaft of the motor extends rearwardly outward from the housing 38 to support a propeller 42 at a distance beneath the portion of the hollow body above it for driven rotation about a horizontal axis parallel to and in the same vertical plane as a central longitudinal axis of the hollow body 24. With this positioning and orientation, operation of the motor will tend to propel the crawler linearly forward along its central longitudinal axis. A knocker assembly 44 supported at the rear end 28 of the hollow body 24 is operable in generally the same manner as that of the prior art crawler to generate an signal that is audibly detectable above the ice layer to allow detection of the crawler beneath the ice layer from thereabove. A battery compartment cover is removably mounted atop the deck surface 30 of the hollow body 24 between the rear ends of the hollow body's projecting portions to facilitate access to the hollow interior of the body 24 in which electronic components are mounted, as described below.

Figure 3:
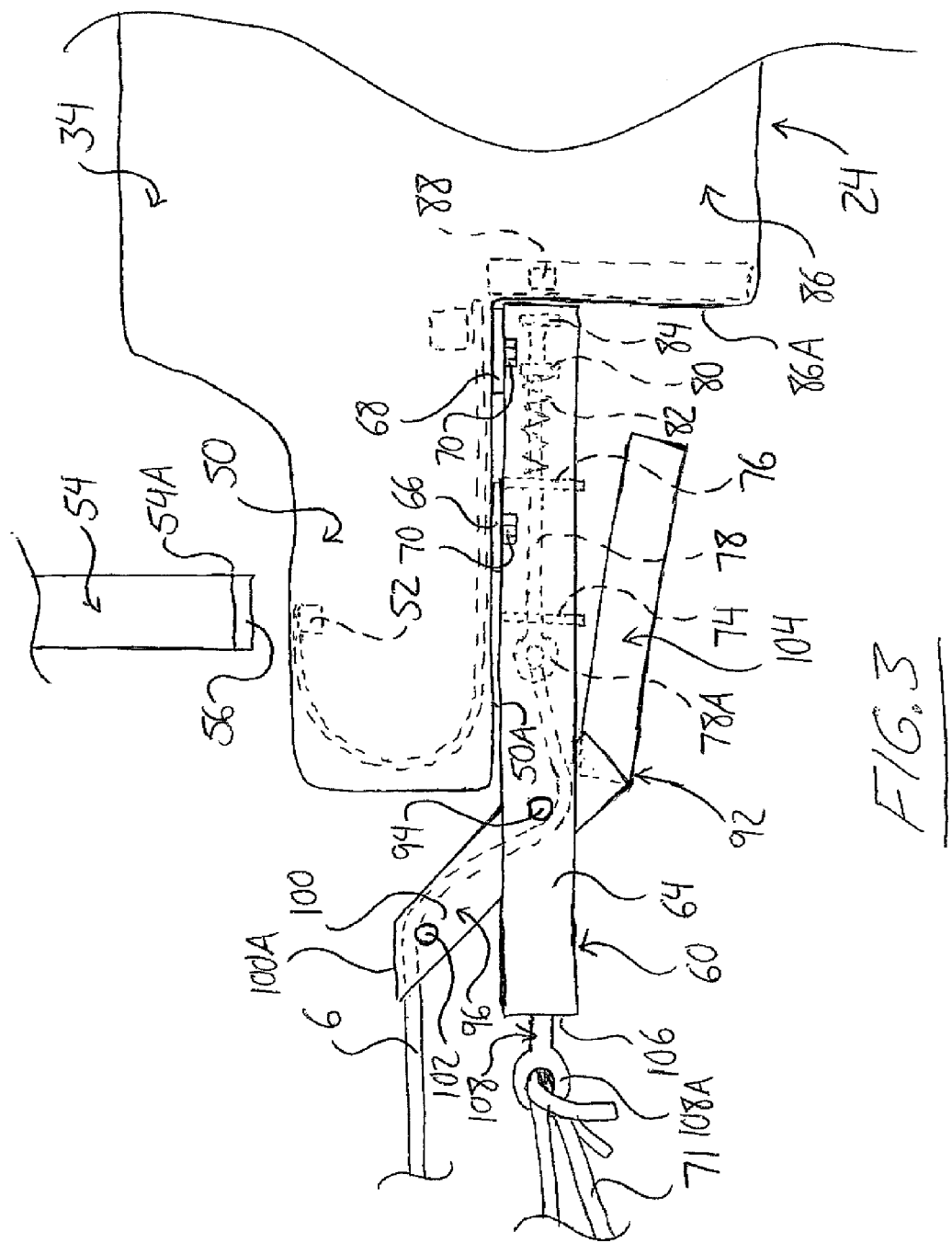
FIG. 3 is a partial side elevational view of the under ice crawler of FIG. 2.

FIG. 3 shows a side elevational view of a rear end of the under ice crawler 20. A rear end or tail portion 50 of the hollow body 24 extends rearward from the projecting portions 32, 34 thereof over the full width of the body 24 and has its upper surface defined by the deck surface 30 spanning the full length of the hollow body 24. Within the hollow interior of the tail portion 50 of the hollow body 24, a magnetic trigger switch 52 wired to the motor 40 to partly define a starting device actuable to effect starting of the motor. The magnetic trigger switch 52 is mounted beneath the deck surface 30 in close proximity thereto between the projecting portions 32, 34 of the hollow body and the rear end 28 thereof. Actuation of the magnetic trigger switch 52 is effect by lowering a rod, shaft or other elongate member 54 through the hole in the ice layer with the under ice crawler disposed beneath the ice in the body of water, the bottom end 54A of the rod 54 being so lowered having a magnetic source 56 mounted on it so that lowering the rod 54 toward the deck surface 30 will expose the magnetic trigger switch 52 to a sufficient magnetic field to effect switching thereof. As shown in FIG. 2, a select area 30A of the deck surface 30 disposed directly over the magnetic trigger switch 52 is marked from rest of the surface surrounding it by the use of a distinct colour to visibly distinguish this area 30 from the rest of the hollow body 24 so that it can be easily identified by a fisherman from above the ice through the hole formed therethrough to facilitate lowering of the crawler 20 into the water. The magnetic source 56, preferably a permanent magnet, generates a magnetic field that acts a starting signal detectable by the magnetic trigger switch 52 when lowered into sufficient proximity thereto to actuate the switch without physical contact therewith to effect starting of the motor 40.

Figure 4:
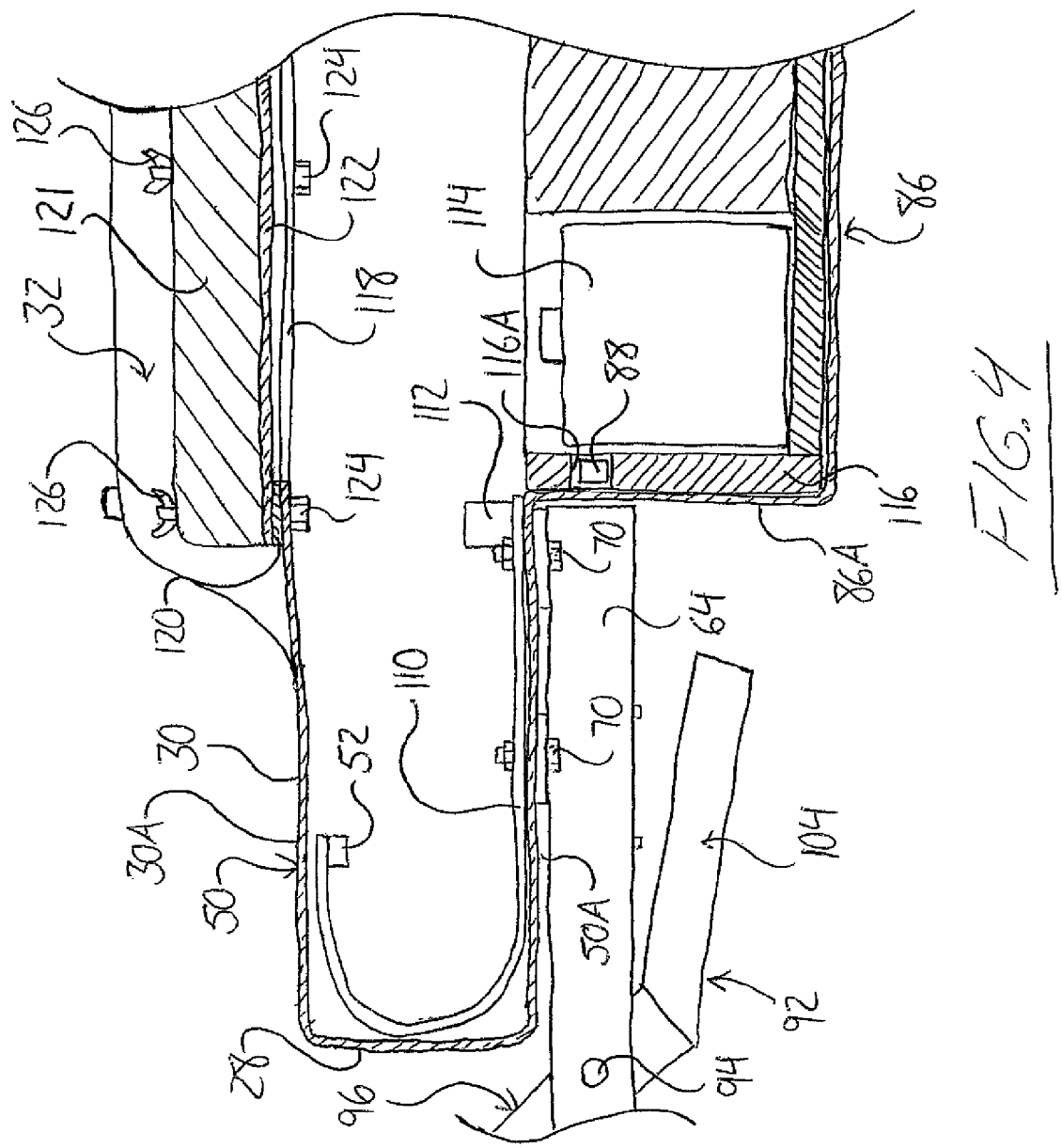
FIG. 4 is a partial cross sectional view of the under ice crawler of FIGS. 2 and 3.
Figure 5:
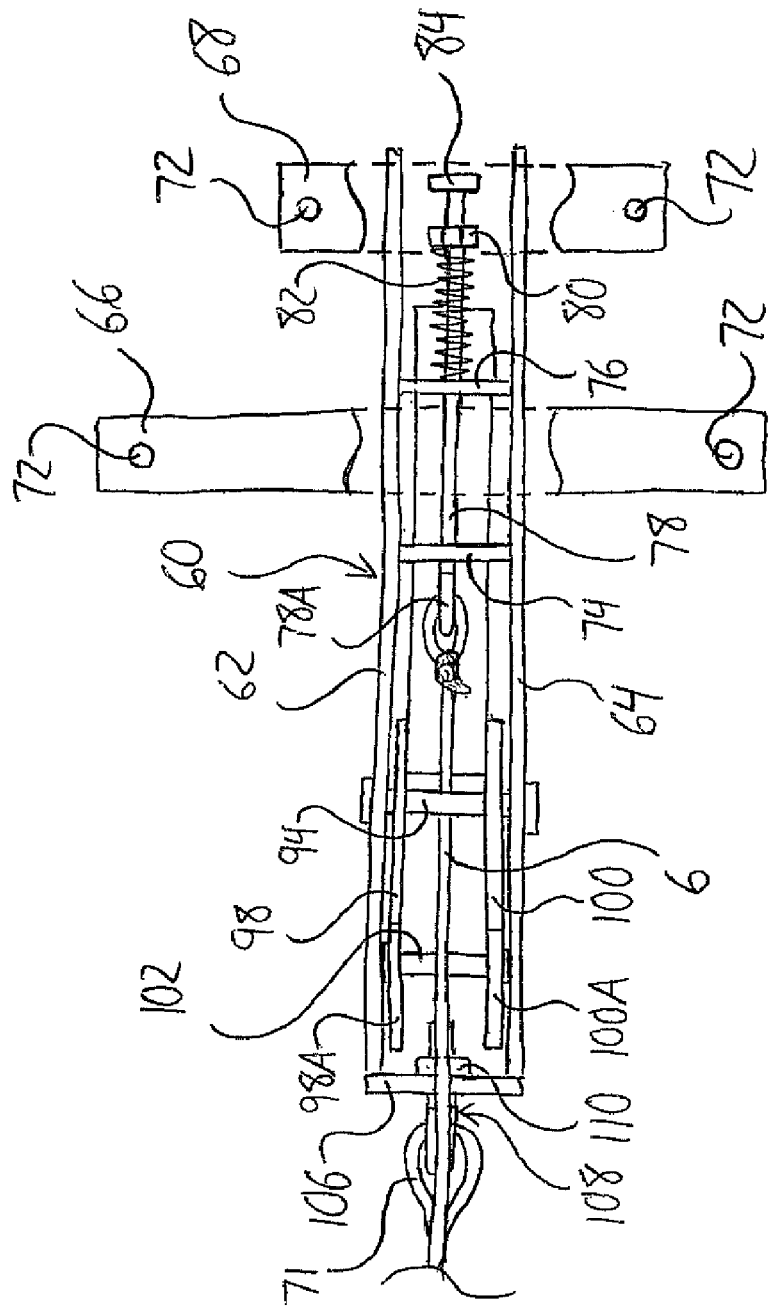
FIG. 5 is an overhead plan view of a rear-end assembly of the under ice crawler of FIGS. 2 to 4 in isolation from a hollow float body thereof.

The knocker assembly 44 features a support structure 60 fixed to a bottom surface 50A of the tail portion 50 of the hollow body 24. As illustrated by FIGS. 3 and 4, the support structure 60 includes a pair of parallel support plates 62, 64 extending horizontally along the bottom surface 50A of the tail portion 50 of the hollow body 24 past its rear end 28, the plates 62, 64 lying in respective vertical planes parallel to the central longitudinal axis of the hollow body 24 on opposite sides thereof. Two cross member mounts 66, 68 are defined by horizontally oriented elongate plates fixed to, for example by welding, and extending perpendicularly across the top edges of the horizontally spaced support plates 62, 64 at spaced positions along the central longitudinal axis of the hollow body 24. The ends of each cross member mount are supported laterally outward from the support plates 62, 64 and each cross member mount is fixed to the bottom surface 50A of the tail portion 50 of the hollow body 24, for example by bolts 70 sealingly threaded into the tail portion 50 from below through bolt holes 72 proximate the ends of the cross member mounts 66, 68.

Two parallel cross member plates 74, 76 fixed to, for example by welding, and spanning between the two support plates 62, 64 perpendicularly thereto are vertically oriented and spaced apart from one another along the central longitudinal axis of the hollow body 24 beneath the tail portion 50 thereof. An eyebolt 78 having its longitudinal axis in the same vertical plane as that of the hollow body 24 extends through aligned through-holes provided in the two cross member plates 74, 76 with its eyelet 78A disposed rearward thereof. A nut or collar 80 fixed to the shaft of the eyebolt 78 proximate an end thereof opposite the eyelet 78A on a side of the cross members plates 74, 76 opposite the eyelet has an outer diameter exceeding the size of the opening in the nearest cross member plate 76, and the eyebolt outer diameter similarly exceeds the opening in the cross member plate 74 nearest to it. The fixed nut 80 and the eyelet 78A thus provide stops defined on the eyebolt 78 to limit sliding thereof in either direction along the passage extending along the longitudinal axis of the hollow body 24 between the openings in the cross member plates 74, 76 by engagement with the stops defined by the two plates at the opposite ends of the passage therethrough. A coil spring 82 wrapping around the shaft of the eyebolt 78 between the nut 80 fixed thereon and the adjacent cross member plate 76 biases the eyebolt 78 away toward the front end 26 of the hollow body 24.

Fixed to the end of the eyebolt 78 opposite the eyelet 78A is a second magnetic source 84 that is supported proximate a forwardmost end of the support rails 62, 64 nearest the front end 26 of the hollow body 24 when the eyebolt 78 is in its forwardmost position biased by the spring 82. Just in front of this forwardmost end of the support rails 62, 64 depending downward from the tail portion 50 of the hollow body beneath the projecting portions 32, 34 at the top end thereof is a hollow battery compartment portion 86 of the hollow body shell 24. Supported inside the battery compartment 86 against or in close proximity to a rear panel 86A thereof, which extends fully across the hollow body perpendicular to the longitudinal axis thereof and depending downward from the bottom panel of the tail portion 50 defining the bottom surface 50A thereof, is a magnetic reset switch 88 disposed at a height along the sidewall of the hollow body and position along the width of the hollow body equal to that of the second magnetic source 84 fixed on the eyebolt 78.

The magnetic reset switch 88 is wired to the electric motor 40 to partly define a termination device that, when the second magnetic source 84 fixed to the eyebolt 78 slidably supported by the cross member plates 74, 76 is biased into its fowardmost position proximate the magnetic reset switch 88 on the opposite side of the battery compartment rear panel 86A, will allow the electric motor to continue operating after being activated by the trigger switch 52, but will deactivate the motor when the second magnetic source is 84 is pulled rearward relative to the rear panel 86A of the battery compartment 86 against the bias of the spring 82 so that the magnetic field emitted by the second magnetic source 84 is no longer effective on the magnetic reset switch 88.

As in the prior art, the deactivation of the motor is effected by the rope 6 connected to the under ice crawler at one end and allowed to be fed out by the fisherman as the crawler pulls the rope out beneath the ice layer. The eyebolt 78 acts as a connector to which the one end of the rope is tied. As the motor 40 is being operated to drive the propeller 42 to linearly displace the crawler beneath the ice and thus draw out the rope thereeneath, once the desired length of rope has been drawn out, the fisherman tightly grips or pulls rearward (i.e. opposite the direction of motion of the crawler) on the rope 6, which cooperates with the forward motion of the crawler to apply a tension to the rope sufficient to pull the slidable eyebolt 78 rearward through the passage defined through the cross member plates 74, 76 relative to the hollow body 24 against the bias of the spring 82, thus pulling the magnetic field emitted by the second magnetic source 84 away from the magnetic reset switch 88 a distance sufficient to void its effect thereon. The magnetic reset switch 88 is thereby switched, this actuation of the termination mechanism terminating operation of the electric motor.

With the motor deactivated and the rope held by the fisherman at the first hole through the ice, the crawler comes to a stop. In order to produce a position-indicating signal detectable above the ice layer, the rope 6 is arranged to also effect actuation of the knocker assembly 44 in a manner similar to the prior art. The knocker assembly features a lever 92 pivotally supported on a pivot pin 94 extending perpendicularly between the parallel support plates 62, 64. The pivot pin 94 extends through a first leg 96 of the lever 92 that extends rearward and upward from the pivot pin 94 to extend obliquely upward past the top edges of the support plates 62, 64. The first leg 96 is made up of a pair of parallel elongate plates 98, 100 lying in parallel vertical planes on opposite sides of that of the central longitudinal axis of the hollow body 24 between the support plates 62, 64 on which they are pivotally mounted. Near their upper ends 98A, 100A above the support plates 62, 64, the elongate plates 98, 100 of the lever feature a cross-pin 102 extending perpendicularly therebetween, maintaining their spaced-apart relationship and contributing to the fixing of the elongate plates together for synchronized movement as a single leg of the lever. The rope connected to the eyelet 78A of the eyebolt 78 extends rearward therefrom beneath the pivot pin 94, then upward and rearward therefrom over the cross-pin 102 to continue rearward away from the crawler.

Fixed to an end of the first leg 96 of the lever opposite the cross-pin 102 is a second leg 104 extending forward at an upwardly-opening oblique angle of less than 180 degrees relative to the first leg 96. The second leg 104 is metal tubing of rectangular cross-section fitted between the two elongate plates 98, 100 and fixed thereto, for example by welding. With the crawler having been stopped, by tensioning of the rope 6 beyond a predetermined value to momentarily pull the eyebolt 78 and the second magnetic source 84 rearward relative to the floating body 24 to switch the magnetic reset switch 88 and deactivate the motor, and the rope tension subsequently released or lessened to return the eyebolt 78 to the spring biased position, the knocking assembly can be operated by rearward jerking of the rope 6 by the fisherman at the first hole through the ice layer. Each such rearward jerk, due to the weaving of the rope about the pivot and cross pins 94, 102 as described above, pulls reward and downward on the cross-pin 102 near the top end of the lever 92, causing the lever to pivot about the pivot pin 94 to lift the second leg 104 up into sudden hard metal on metal contact with the bottom edges of the cross member plates 74, 76, which may be situated slightly below the bottom edges of the support plates they each span between, to create a knocking or banging sound sufficiently loud to be detectable through the ice layer by a person thereatop. It should be appreciated that the spaced apart cross member plates may be replaced by a solid body spanning along the support plates with a single through hole defined through it to slidably support the eyebolt 78, the second leg of the knocker lever contacting the bottom surface of the solid body to create the knocking or clapping sound.

The angle between the two legs of the lever is chosen such that when the second leg 104 is lifted against the cross plates 74, 76, the upper end of the first leg 96 remains above the top edges of the supporting plates 62, 64 and the first leg does not move down sufficiently far to contact an end cross plate 106 extending between the support plates 62, 64 at their rear ends distal to the hollow body 24. A second eyebolt 108 is fixed to the end cross plate 106 to project rearward therefrom to its eyelet 108A, for example by clamping to the end cross plate by way of a nut 110 mated with the eyebolt's threaded shaft on the forward side of the end plate opposite the eyelet. The second eyebolt 108 forms a second connector, by which a net 71 may also be connected to the crawler, thereby allowing deployment of the net below the ice by retaining a first end of the net at the first hole in the ice, running the crawler to deploy the net and then drilling the second hole to recover the ice crawler and the second end of the net, rather than the prior art method of running just the rope 6 in this fashion and then connecting the net to the rope's second end, once detached from the crawler, and drawing the net under the ice by pulling of the rope back through the first hole by its first end. This reduces the steps required to deploy the net beneath the ice while still using the rope to stop the crawler and operate the knocker.

FIG. 4 is a partial side elevational view of the under ice crawler with the hollow body 24 cut away along the central longitudinal axis thereof to show the contents of its hollow tail and battery compartment portions 50, 86. A mounting plate 110 is bent to have a J-shaped cross section arranged to lay flat atop the bottom panel 50A of the tail portion, extending horizontally from the rear panel 86A of the battery compartment 86 toward the rear end 28 of the hollow body 24 and then curving upward and back over itself to support the magnetic trigger switch 52 just beneath the deck surface 30 within the tail portion 50 of the hollow body 24. At the end of the mounting plate 110 opposite magnetic trigger switch 52, resting atop the bottom panel 50A of the tail portion 50 immediately adjacent the rear panel 86A of the battery compartment portion 86 extending downward from the tail portion bottom panel 50A, is a relay 112. The J-shaped plate is flexible and is initially flat with the trigger switch mounted to it before installation in the interior of the hollow shell body 24, so that it can be positioned within the hollow tail portion 50 so that it bends into the J-shaped configuration shown with the tendency of the plate to return to its original flattened condition biasing the flat and curved portions of the J-shaped cross section in opposite directions against the top and bottom panels of the tail portion 50 defining the deck surface 30 and the bottom surface 50A respectively to support the trigger switch 52 adjacent the top of the tail portion 50. This eases installation of the trigger switch by eliminating the need to mount it directly to the interior top surface of the hollow body's tail portion 50, instead only requiring sliding of the mounting plate into the tail portion in the bent J-shaped configuration shown.

Below the tail portion 50, the battery compartment 86 is filled with blocks of Styrofoam sized and positioned to fit snugly about a rechargeable battery 114 to prevent movement thereof within the hollow interior of the crawler body during use. A rear end block 116 fitted against the rear panel 86A of the battery compartment has a hollowed out portion forming an through-hole 116A therein in which the magnetic reset switch 88 is mounted against, or at least in close proximity to the rear panel 86A. The thickness of the rear end block 116 (measured along the longitudinal axis of the hollow body, forward from the rear end panel 86A of the battery compartment 86) slightly exceeds the corresponding dimension of the magnetic reset switch so that any shifting of the battery 114 will not damage the switch, as any impact will take place between the battery and the Styrofoam block.

A rectangular opening 118 is provided in the deck surface 30 between the two projecting portions 32, 34 of the hollow body 24 to allow access to the interior thereof and the electrical components mounted therein. An annular foam gasket 120 has a bottom face thereof adhesively fixed to the deck surface 30 around the opening 118 and a lid 121 for the opening is provided with a rubber gasket 122 adhesively secured to a bottom face of the rectangular lid over its full surface area. The panel or wall of the hollow body 24 defining the deck surface 30 has bolts 124 fixed to its inside or bottom surface opposite the deck surface to project upward out of the hollow interior through the panel so that through-holes provided in the lid 121 can be aligned with and lowered over the bolt shafts, which then project upward past the top of the lid to be fitted with wing-nuts 126 to clamp the lid in place over the opening 118. Seals are provided at the engagement of the wing-nuts with the lid and the bolt heads with the deck surface panel to cooperate with the gaskets between the lid and the deck surface to seal the hollow interior of the body 24 from water entry.

Figure 6:
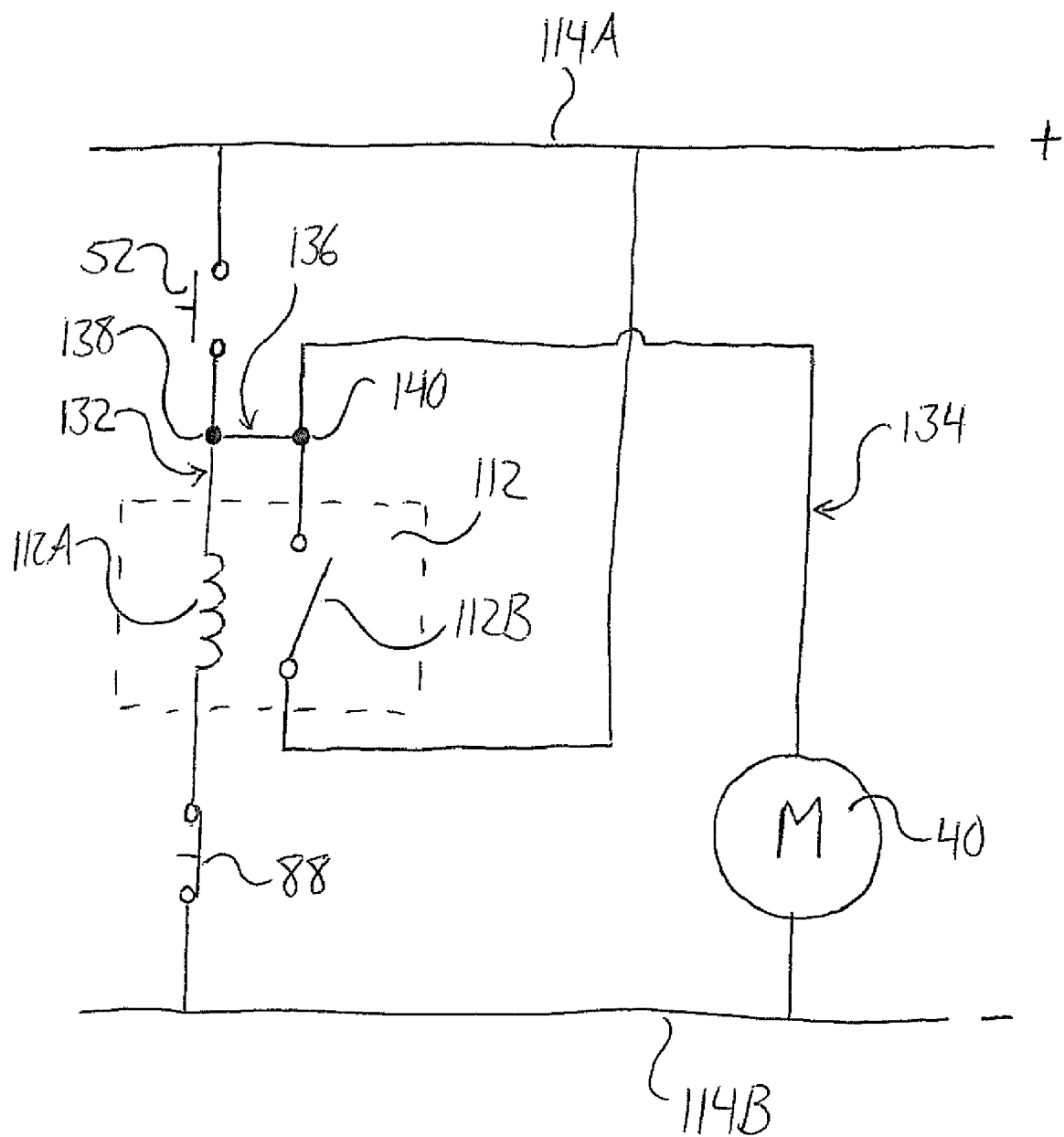
FIG. 6 is a schematic illustration of a control circuit used to activate and deactivate a motor of the under ice crawler of FIGS. 2 to 5.

FIG. 6 illustrates the circuit 130 in which the motor 40, magnetic trigger switch 52, magnetic reset switch 88 and relay 112 are installed between the positive terminal 114A and negative terminal 114B of the battery 114 to control selective operation of the motor-driven propeller 42. The circuit is a bistable latching relay circuit that will keep the motor in one of two stable states, either running or not, until external input is received from the fisherman. The trigger switch 52 is a normally open, momentarily closable switch which is closed only when a sufficiently strong magnetic field acts on it, for example in the presence of the magnetic source 56 on the starting rod 54 when lowered through the hole in the ice into proximity with the magnetic trigger switch. This closing of the trigger switch 52 will activate the motor 40 to drive the propeller 42 and move the under ice crawler 20 away from the first hole in the ice therebeneath in the body of water. This pulls the trigger switch 52 out of proximity with the starter magnetic source 54, causing the switch to re-open, but the relay circuit latches to keep the motor connected to the power supply for continued operation, i.e. a stable running state. The reset switch 88 is a normally closed, momentarily openable switch, the opening of which with the motor running will disengage the latching effect to open the connection between the power supply and the motor for shutting down thereof. The motor will remain deactivated, i.e. in a stable off state, until the trigger switch is again closed.

Looking at FIG. 6, the latching relay circuit 130 features a first line 132 connected between the positive and negative terminals 114A, 144B of the battery and having installed therein the magnetic trigger switch 52, the coil 112A of the relay 112 and the magnetic reset switch 88 in series from the positive terminal to the negative terminal. A second line 134 also connected between the two battery terminals features a normally open switch 112B of the relay and the motor 40 installed in series from the positive terminal to the negative terminal, so that the first and second lines would be parallel if not for a connecting line 136 between them. This connecting line 136 connects a node 138 found between the trigger switch 52 and relay coil 112A on the first line 132 with a node 140 found between the relay switch 112B and the motor 40 on the second line 134. When the trigger switch 52 is closed, current flows through the coil 112A of the relay 112 and on through the normally closed reset switch 88. This activation of the coil 112A closes the normally open relay switch 112B, thus electrically connecting the motor 40 between the battery terminals for operation. When the trigger switch 52 is released back into its normally open position, the relay coil 112A remains energized to keep the relay switch 112B closed and the motor running because current flows into the first line 132 at the node 138 between the open trigger switch 52 and the coil 112A through the connecting line 136 from the second line 134. The motor 40 is only deactivated when the normally closed reset switch is opened to open the first line 132 between the relay coil 112A and the negative battery terminal 114B, which stops current flow through the coil to return the relay switch 112A to its normally open position, cutting current flow to the motor 40. Return of the reset switch 88 to its normally closed position will not re-activate the motor until the relay coil 112A is re-energized by a subsequent closing of the normally open trigger switch 52.

It will be appreciated from the forgoing that the normally closed condition of the magnetic switch described in the context of the circuit illustration in FIG. 6 is defined through cooperation of the movably carried second magnetic source 84 and the fixed magnetic reset switch 88 of the under ice crawler, as illustrated in FIG. 3. Considered in isolation, the magnetic reset switch 88 is actually a normally open magnetic switch, but in the context of the whole under ice crawler 20, the magnetic reset switch 88 is normally closed due to the biasing of the second magnetic source 84 into sufficient proximity with the magnetic reset switch for retention thereof in the closed position. The opening of the magnetic reset switch 88 is thus effected by the pulling of the eyebolt connector 78 rearward relative to the rear panel 86A of the hollow body's battery compartment, where the reset switch is mounted, under sufficient tensioning of the rope 6 to overcome the biasing spring 82 to pull the second magnetic source 84 out of the biased position in which its magnetic field keeps the otherwise normally open switch closed.

It should be appreciated that other types of bistable circuits are known and may similarly be used to control operation through separate trigger and reset switches to start and stop the motor respectively while allowing the mounting of the trigger switch separate from the rest switch in a position easy to actuate through the hole in the ice above the crawler. The bistable latching relay circuit of the illustrated embodiment provides a simple cost-efficient construction making use of readily available off the shelf parts.

Furthermore, the improved ease of operation provided by the use of separate switches for starting and terminating operation of the motor carried on the floating body at distinct positions suitable for easy access to the trigger switch from above the crawler is not limited to the specific use of magnetic switches. For example, a normally open momentary pushbutton switch may be used as a trigger switch, the pushbutton mounted to project upward from the deck surface 30 at the tail portion 50 of the floating body for depression by a magnetless starting rod lowered through the hole in the ice. Similarly, a conductor could be carried on the end of the eyebolt or other connector to which the rope is to be secured in place of the second magnetic source 84, the conductor acting as the reset switch by being biased into physical contact between two otherwise electrically unconnected contact nodes and pullable out of such contact into an open position by the aforementioned pulling of the connector relative to the hollow body on which the two contact nodes would be carried. However, the use of a magnetic reset switch allows the electrical components to be stored within the sealed hollow body 24 without the need for an additional seal through which the connector could slide to open and close the switch, as the magnetic switches are operable through the hollow shell body 24.

Just as the advantage of the use of distinct on and off switches for operation of the termination device by the rope without positioning the starting device in hard to reach area does not necessarily rely on the use of magnetic switches, neither does the advantage of being able to effect actuation of the starting device without physical contact therewith. For example, the use of the magnet-equipped elongate member lowerable into proximity with the magnetic trigger switch may be replaced with a transmitter equipped remote control that can send a wireless start signal through the hole in the ice to a receiver carried on the hollow body 24. However, a conventional electrical wireless remote requires its own power supply, typically in the form of a dedicated battery. For the same reason, the use of a permanent magnet for each of the magnetic sources in the illustrated embodiment is preferred, as it avoids the need for separate power supplies, such as a battery for operation of an electromagnet.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An under ice crawler lowerable through a hole in a layer of ice into a body of water therebeneath and operable to extend a flexible line within the body of water between two points spaced apart along the layer of ice, the crawler comprising:

a floating body having sliding surfaces defined at an upper limit thereof to allow sliding of the floating body along the layer of ice against an undersurface thereof;

an electrical power supply carried on the floating body;

a motor carried on the floating body to selectively drive a propeller when powered by the electrical power supply via a control circuit between the motor and the electrical power supply, selective operation of the motor driving the floating body in a forward direction within the body of water below and along the layer of ice;

a connector carried on the floating body to facilitate the connection of the line thereto, the connector comprising an eyebolt supported for axial sliding movement relative to the floating body in a passage that is defined thereon and extends along the forward direction;

a termination device carried on the floating body and operably linked with the motor to terminate operation thereof upon actuation of the termination device; and a starting device operatively linked with the motor and comprising:

a starting-signal receiver carried on the floating body and actuable to effect starting of the motor thereof upon detection of a starting-signal; and a starting-signal generator separate from the floating body and configured to be manually operable from above the layer of ice to deliver the starting-signal to the starting-signal receiver without physical contact with the floating body, or any component carried thereon, below the layer of ice;

wherein the termination device comprises:

a terminating magnetic switch fixed to the floating body;

a terminating magnetic source mounted on the eyebolt, the eyebolt and the terminating magnetic source mounted thereon being slidable out of a position proximate the terminating magnetic switch by application of a pulling force to the eyebolt in a rearward direction opposite the forward direction; and a spring fitted about the eyebolt between a collar fixed thereon and a stop defined at a fixed position along the passage to bias the eyebolt and the terminating magnetic source mounted thereon into the position proximate the terminating magnetic switch, in which position the terminating magnetic source exerts a magnetic field on the terminating magnetic switch to close a portion of the control circuit between the motor and the electrical power supply, whereby the termination device is actuable to terminate operation of the motor by pulling of the eyebolt out of the position proximate the terminating magnetic switch to open the portion of the control circuit between the motor and the electrical power supply.

2. The crawler according to claim 1 wherein the control circuit is a bistable circuit having the starting and termination devices installed therein to establish connected between the power supply and the motor upon actuation of the starting device and retain the connection between the power supply and the motor until actuation of the termination device.

3. The crawler according to claim 2 wherein the bistable circuit is a latching relay circuit in which the starting device comprises a momentarily closable trigger switch and the magnetic termination switch of the termination device comprises a momentarily openable reset switch.

4. The crawler according to claim 3 wherein the trigger switch comprises a magnetic trigger switch closable by movement of the starting signal generator comprising a triggering magnetic source, separate from the floating body, into proximity with the magnetic trigger switch through the opening in the ice layer.

5. The crawler according to claim 1 wherein the starting-signal receiver comprises a starting magnetic switch and the starting-signal generator comprises a starting magnetic source, the starting magnetic switch actuable by the starting magnetic source lowerable through the hole in the layer of ice into sufficient proximity with the starting magnetic switch to effect switching thereof.

6. The crawler according to claim 5 wherein the control circuit is a bistable circuit having the starting and terminating devices installed therein to establish connection between the power supply and the motor upon actuation of the starting device and retain the connection between the power supply and the motor until actuation of the termination device.

7. The crawler according to claim 1 further comprising a knocker arranged to engage with the line at a point therealong spaced from the connection thereof with the eyebolt such that pulling of the line in the rearward direction effects the pulling of the eyebolt out of the position proximate the terminating magnetic switch and also actuates the knocker to produce an audible position-signal detectable above the layer of ice to determine a position of the floating body beneath the layer of ice from thereabove.

8. The crawler according to claim 7 wherein the knocker comprises a lever supported for pivotal motion about an axis transverse to the forward direction and arranged to engage the line at a distance from the axis to swing an end of the knocker about the axis to contact a corresponding member carried on the floating body under pulling of the line.

9. The crawler according to claim 1 wherein the floating body comprises a hollow body defining the sliding surfaces.

10. The crawler according to claim 9 wherein the hollow body comprises a hollow body defining the sliding surfaces.

11. The crawler according to claim 1 wherein a switching portion of the starting-signal receiver of the starting device and the terminating magnetic switch of the terminating device are supported within a hollow portion of the floating body and are actuable from outside the hollow portion of the floating body.

12. The crawler according to claim 1 wherein the starting device is actuable from above a deck surface of the floating body which is defined below and between the sliding surfaces.

* * * * *